(12) United States Patent
Takahashi et al.

(10) Patent No.: US 11,516,688 B2
(45) Date of Patent: Nov. 29, 2022

(54) TERMINAL APPARATUS, BASE STATION APPARATUS, AND COMMUNICATION METHOD

(71) Applicants: Sharp Kabushiki Kaisha, Sakai (JP); FG Innovation Company Limited, Tuen Mun (HK)

(72) Inventors: Hiroki Takahashi, Sakai (JP); Shohei Yamada, Sakai (JP); Hidekazu Tsuboi, Sakai (JP); Kazunari Yokomakura, Sakai (JP)

(73) Assignees: SHARP KABUSHIKI KAISHA, Sakai (JP); FG INNOVATION COMPANY LIMITED

( * ) Notice: Subject to any disclaimer, the term of this patent is extended or adjusted under 35 U.S.C. 154(b) by 0 days.

(21) Appl. No.: 16/471,062

(22) PCT Filed: Dec. 20, 2017

(86) PCT No.: PCT/JP2017/045718
§ 371 (c)(1),
(2) Date: Jun. 19, 2019

(87) PCT Pub. No.: WO2018/117147
PCT Pub. Date: Jun. 28, 2018

(65) Prior Publication Data
US 2019/0387423 A1 Dec. 19, 2019

(30) Foreign Application Priority Data
Dec. 20, 2016 (JP) .............................. JP2016-246461

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/318* (2015.01); *H04L 5/0048* (2013.01); *H04W 52/24* (2013.01); *H04W 56/001* (2013.01)

(58) Field of Classification Search
None
See application file for complete search history.

(56) References Cited

U.S. PATENT DOCUMENTS

2012/0003943 A1* 1/2012 Marinier ........... H04W 36/0085
455/73
2012/0329503 A1* 12/2012 Jongren ................. H04W 52/10
455/509

(Continued)

FOREIGN PATENT DOCUMENTS

JP 2015-92735 A 5/2015
WO 2010/151040 A2 12/2010

OTHER PUBLICATIONS

Official Communication issued in International Patent Application No. PCT/JP2017/045718, dated Jan. 30, 2018.
(Continued)

*Primary Examiner* — Alpus Hsu
*Assistant Examiner* — Camquyen Thai
(74) *Attorney, Agent, or Firm* — Keating & Bennett, LLP

(57) ABSTRACT

A terminal apparatus includes: a receiver configured to receive a plurality of reference signals from a base station apparatus in a cell; a measurement unit configured to measure at least one reference signal received power (RSRP) of at least one of the plurality of reference signals; and a calculating unit configured to average N highest ones of the at least one RSRP measured to obtain a reference RSRP of the cell.

8 Claims, 11 Drawing Sheets

(51) Int. Cl.
*H04L 5/00* (2006.01)
*H04W 52/24* (2009.01)
*H04W 56/00* (2009.01)

(56) References Cited

U.S. PATENT DOCUMENTS

| | | | |
|---|---|---|---|
| 2013/0077569 A1 | 3/2013 | Nam et al. | |
| 2013/0095819 A1* | 4/2013 | Cheng | H04W 36/0094 455/424 |
| 2013/0102345 A1 | 4/2013 | Jung | |
| 2013/0142113 A1* | 6/2013 | Fong | H04W 68/02 370/328 |
| 2013/0217404 A1* | 8/2013 | Jung | H04W 40/08 455/452.1 |
| 2014/0113677 A1* | 4/2014 | Parkvall | H04W 52/242 455/522 |
| 2014/0177531 A1* | 6/2014 | Imamura | H04L 5/0035 370/328 |
| 2014/0185481 A1* | 7/2014 | Seol | H04W 52/24 370/252 |
| 2014/0221038 A1* | 8/2014 | Nakashima | H04W 52/365 455/522 |
| 2014/0328298 A1* | 11/2014 | Hooli | H04W 52/242 370/329 |
| 2015/0003442 A1* | 1/2015 | Sun | H04W 56/0015 370/350 |
| 2015/0222402 A1* | 8/2015 | Ouchi | H04W 72/0413 370/329 |
| 2015/0304090 A1* | 10/2015 | Ko | H04W 72/085 370/329 |
| 2016/0337101 A1* | 11/2016 | Gao | H04W 24/10 |
| 2017/0034725 A1* | 2/2017 | Negishi | H04W 24/08 |
| 2017/0324459 A1* | 11/2017 | Koskela | H04W 24/08 |
| 2018/0270717 A1* | 9/2018 | Kakishima | H04B 7/0617 |
| 2019/0075526 A1* | 3/2019 | Nagaraj | H04B 7/0408 |
| 2019/0174423 A1 | 6/2019 | Zhang et al. | |
| 2019/0174436 A1* | 6/2019 | da Silva | H04L 5/0023 |
| 2019/0182785 A1* | 6/2019 | da Silva | H04W 48/08 |

OTHER PUBLICATIONS

NTT Docomo, "Revision on SI: Study on New Radio Access Technology", 3GPP TSG RAN Meeting #72, RP-161214, Jun. 13-16, 2016, 8 pages.

Nokia et al., "Basic principles for the 5G New Radio access technology", 3GPP TSG-RAN WG1 #84bis, R1-162883, Apr. 11-15, 2016, 6 pages.

Intel Corporation, "Overview of antenna technology for new radio interface", 3GPP TSG-RAN WG1 #84bis, R1-162380, Apr. 11-15, 2016, pp. 1-3.

Ericsson, "Overview of NR", TSG-RAN WG1 #84bis, R1-163215, Apr. 11-15, 2016, 2 pages.

Samsung, "Discussion on Beam Measurement for 5G New Radio Interface in mmWave Frequency Bands", 3GPP TSG RAN WG2 #94, R2-163652, May 23-27, 2016, 4 pages.

Nokia et al., "Mobility Measurement in IDLE and INACTIVE Mode", 3GPP TSG-RAN WG2 Meeting #96, R2-167712, Nov. 14-18, 2016, 5 pages.

International Patent Application No. PCT/CN2016/093718, filed on Aug. 5, 2016.

Samsung, "Measurements for Cell-level Mobility in High Frequency NR", 3GPP TSG RAN WG2 #95, R2-165150, Aug. 22-26, 2016, pp. 1-4.

MediaTek Inc., "Consolidation of Multiple Beams for DL Measurements", 3GPP TSG-RAN WG2 Meeting #96, R2-168000, Nov. 14-18, 2016, pp. 1-5.

Nokia et al., "Power Control for MIMO", 3GPP TSG-RAN WG1 Meeting #87, R1-1612876, Nov. 14-18, 2016, 3 pages.

* cited by examiner

| FIRST CONFIGURATION | FREQUENCY/ TIME RESOURCE | FIRST RECEIVED POWER |
|---|---|---|
| CONFIGURATION 1 | RESOURCE 1 | RSRP IN RESOURCE 1 |
| CONFIGURATION 2 | RESOURCE 2 | RSRP IN RESOURCE 2 |
| CONFIGURATION 3 | RESOURCE 3 | RSRP IN RESOURCE 3 |

FIG. 7

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2016-246461 filed on Dec. 20, 2016, the contents of which are incorporated herein by reference.

BACKGROUND ART

The Third Generation Partnership Project (3GPP) is currently working on technical studies and standard formulation for Long Term Evolution (LTE)-Advanced Pro and New Radio technology (NR) as radio access schemes and wireless network technologies for fifth generation cellular systems (NPL1).

The fifth-generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

For the NR, technical studies are in progress for massive Multiple-Input Multiple-Output (MIMO) that uses a large number of antenna elements at high frequencies to guarantee coverage with a beamforming gain (NPL 2, NPL 3, and NPL 4).

CITATION LIST

Non Patent Literature

NPL 1: RP-161214, NTT DOCOMO, "Revision of SI: Study on New Radio Access Technology", June 2016

NPL 2: R1-162883 Nokia, Alcatel-Lucent ShanghaiBell, "April Basic Principles for the 5G New Radio Access technology", April 2016

NPL 3: R1-162380, Intel Corporation, "Overview of antenna technology for new radio interface", April 2016

NPL 4: R1-163215, Ericsson, "Overview of NR", April 2016

SUMMARY OF INVENTION

Technical Problem

An aspect of the present invention provides a terminal apparatus capable of efficiently communicating with a base station apparatus, a base station apparatus communicating with the terminal apparatus, a communication method used for the terminal apparatus, and a communication method used for the base station apparatus. For example, the communication methods used for the terminal apparatus and the base station apparatus may include an uplink transmission method, a modulation method, and/or a coding method for achieving efficient communications, reducing complexity, and reducing interference between cells and/or between terminal apparatuses.

Solution to Problem (1) According to an aspect of the present invention, the following measures are provided. A first aspect of the present invention provides a terminal apparatus including: a receiver configured to receive a plurality of reference signals from a base station apparatus in a cell; a measurement unit configured to measure at least one reference signal received power (RSRP) of at least one of the plurality of reference signals; and a calculating unit configured to average N highest ones of the at least one RSRP measured to obtain a reference RSRP of the cell.

(2) A second aspect of the present invention provides the terminal apparatus further including a transmit power control unit configured to determine, based on one of the at least one RSRP, transmit power of an uplink signal and/or an uplink channel to be transmitted in the cell.

(3) A third aspect of the present invention provides the terminal apparatus in which the plurality of reference signals are secondary synchronization signals.

(4) A fourth aspect of the present invention provides a base station apparatus including: a transmitter configured to transmit, to a terminal apparatus, a plurality of reference signals in a cell; and a receiver configured to receive a measurement report on a reference reference signal received power (RSRP) obtained by averaging N RSRP of at least one RSRP of at least one of the plurality of reference signals received by the terminal apparatus.

(5) A fifth aspect of the present invention provides the base station apparatus in which the receiver configured to receive, from the terminal apparatus, an uplink signal and/or uplink channel transmitted at transmit power based on one of the at least one RSRP.

(6) A sixth aspect of the present invention provides the base station apparatus in which the plurality of reference signals are secondary synchronization signals.

(7) A seventh aspect of the present invention provides a communication method used for a terminal apparatus including: receiving a plurality of reference signals from a base station apparatus in a cell; measuring at least one reference signal received power (RSRP) of at least one of the plurality of reference signals; and averaging N highest ones of the at least one RSRP measured to obtain a reference RSRP of the cell.

(8) An eighth aspect of the present invention provides a communication method used for a base station apparatus including: transmitting, to a terminal apparatus, a plurality of reference signals in a cell; and receiving a measurement report on a reference signal received power (RSRP) obtained by averaging N RSRP of at least one RSRP of at least one of the plurality of reference signals received by the terminal apparatus.

Advantageous Effects of Invention

According to an aspect of the present invention, a terminal apparatus and a base station apparatus can communicate with each other efficiently and/or in a less complex manner.

BRIEF DESCRIPTION OF DRAWINGS

FIG. 7 is a diagram illustrating an example of a case in which a terminal apparatus 1 according to an embodiment of the present invention receives information for identifying the configuration of three reference signals in a certain cell.

DESCRIPTION OF EMBODIMENTS

Embodiments of the present invention will be described below.

LTE (and LTE-Advanced Pro) and NR may be defined as different Radio Access Technologies (RATs). NR may be defined as a technology included in LTE. The present embodiment may be applied to NR, LTE and other RATs. Terms associated with LTE are used in the following description. However, the present invention may be applied to other technologies using other terms.

Figure 1:
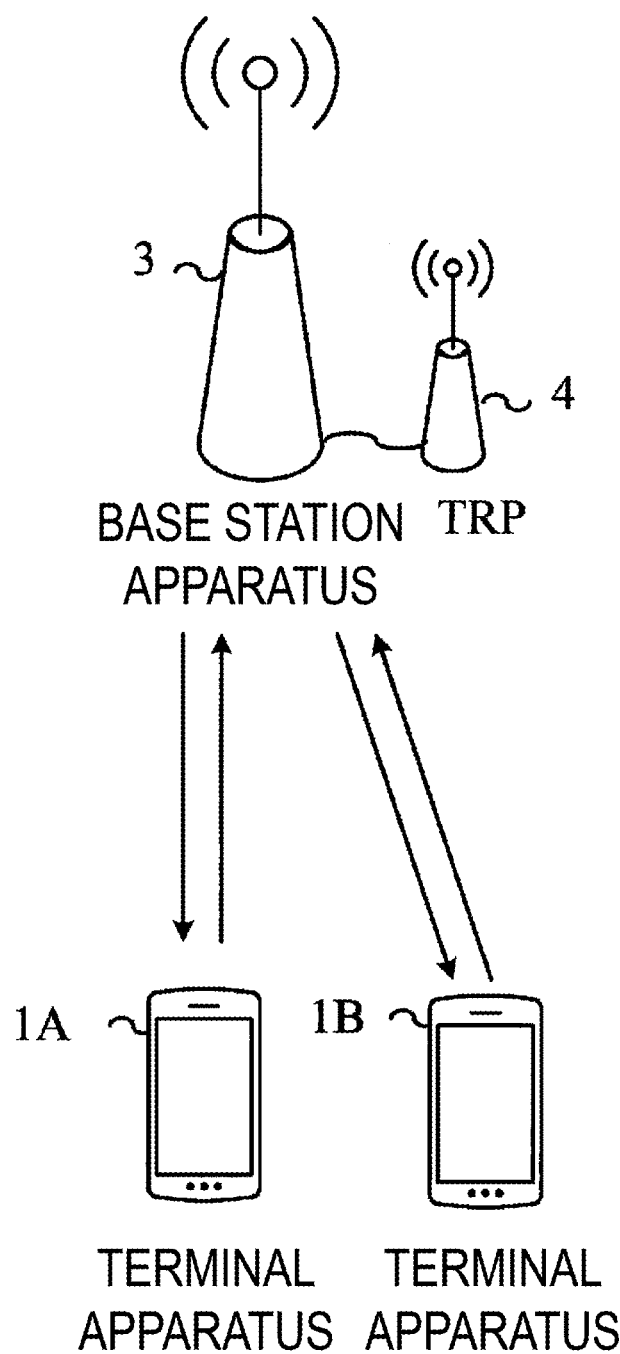
FIG. 1 is a conceptual diagram of a radio communication system according to an embodiment of the present invention.

FIG. 1 is a conceptual diagram of a radio communication system according to an embodiment of the present embodiment. In FIG. 1, the radio communication system includes a terminal apparatus 1A, a terminal apparatus 1B, and a base station apparatus 3. The terminal apparatus 1A and the terminal apparatus 1B are also referred to as a terminal apparatus 1.

The terminal apparatus 1 may also be referred to as a mobile station device, User Equipment (UE), a communication terminal, a mobile device, a terminal, and a Mobile Station (MS). The base station apparatus 3 may also be referred to as a radio base station apparatus, a base station, a radio base station, a fixed station, a Node B (NB), an evolved Node B (eNB), NR Node B (NR NB), next generation Node B (gNB)m an access point, a Base Transceiver Station (BTS), and a Base Station (BS). The base station apparatus 3 may include a core network apparatus. Furthermore, the base station apparatus 3 may include one or more Transmission Reception Points 4 (TRPs). At least some of the functions/processes of the base station apparatus 3 described below may be functions/processes at each of the transmission reception points 4 in the base station apparatus 3. The base station apparatus 3 may configure a coverage (communicable area), controlled by the base station apparatus 3, to have one or more cells to serve the terminal apparatus 1. The base station apparatus 3 may also configure a coverage (communicable area), controlled by one or more transmission reception points 4, to have one or more cells to serve the terminal apparatus 1. The base station apparatus 3 may also divide one cell into multiple beamed areas to serve the terminal apparatus 1 in each of the beamed areas. Here, a beamed area may be identified based on a beam index used for beamforming or a precoding index.

The communication area covered by the base station apparatus 3 may vary in size and shape for each frequency. Moreover, the covered area may vary for each frequency. A radio network, in which cells having different types of base station apparatuses 3 and different cell radii coexist at the same frequency or different frequencies to form a single communication system, is referred to as a heterogeneous network.

A radio communication link from the base station apparatus 3 to the terminal apparatus 1 is referred to as a downlink. A radio communication link from the terminal apparatus 1 to the base station apparatus 3 is referred to as an uplink. A radio communication link from the terminal apparatus 1 to another terminal apparatus 1 is referred to as a sidelink.

In FIG. 1, in a radio communication between the terminal apparatus 1 and the base station apparatus 3, and/or a radio communication between the terminal apparatus 1 and another terminal apparatus 1, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, and/or the radio communication between the terminal apparatus 1 and another terminal apparatus 1, Universal-Filtered Multi-Carrier (UFMC), Filtered OFDM (F-OFDM), Windowed OFDM, or Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention. For example, the OFDM symbol in the present embodiment may be SC-FDM symbols (which may also be referred to as Single-Carrier Frequency Division Multiple Access (SC-FDMA) symbols.

Furthermore, in FIG. 1, in the radio communication between the terminal apparatus 1 and the base station apparatus 3, and/or the radio communication between the terminal apparatus 1 and another terminal apparatus 1, the CP may not be used, or the above-described transmission scheme with zero padding may be used instead of the CP. Moreover, the CP or zero passing may be added both forward and backward.

According to the present embodiment, one or more serving cells are configured for the terminal apparatus 1. A plurality of configured serving cells includes one primary cell and at least one of the plurality of secondary cells. The primary cell is a serving cell in which an initial connection establishment procedure has been performed, a serving cell in which a connection re-establishment procedure has been initiated, or a cell indicated as a primary cell during a handover procedure. One or more secondary cells may be configured at a point of time when or after a Radio Resource Control (RRC) connection is established.

Time Division Duplex (TDD) and/or Frequency Division Duplex (FDD) may be applied to the radio communication system according to the present embodiment. A time division duplex (TDD) scheme or a frequency division duplex (FDD) scheme may be applied to all the multiple cells. Cells to which the TDD scheme is applied and cells to which the FDD scheme is applied may be aggregated.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals according to the present embodiment will be described. Note that the downlink physical channels and/or the downlink physical signals may be collectively referred to as downlink signals. The uplink physical channels and/or the uplink physical signals may be collectively referred to as uplink signals. The downlink physical channels and/or the uplink physical channels may be collectively referred to as a physical channel. The downlink physical signals and/or the uplink physical signals may be collectively referred to as physical signals.

In FIG. 1, the following physical channels are used for the radio communication between the terminal apparatus 1 and the base station apparatus 3. The physical channels are used for transmission of information output from a higher layer.

Physical Broadcast CHannel (PBCH)
Physical Control CHannel (PCCH)
Physical Shared CHannel (PSCH)
Physical Random Access CHannel (PRACH)

The PBCH is used by the base station apparatus 3 to broadcast an essential information block, such as Master Information Block (MIB) and Essential Information Block (EIB), which includes essential information needed by the terminal apparatus 1. Here, one or more essential information blocks may be transmitted as an essential information message. For example, the essential information block may include information (e.g., information about the location in a superframe including multiple frames) indicating a part or the entirety of the frame number (System Frame Number (SFN)). For example, a radio frame (10 ms) includes 10 subframes (1 ms), and is identified by a frame number. The frame number is wrapped around by 1024. Furthermore, in a case that different essential information blocks are transmitted in the respective areas within the cell, each essential information block may include information for identifying the corresponding area (for example, identifier information about a base station transmission beam constituting the area). Here, the identifier information of the base station transmission beam may be indicated using the index of the base station transmission beam (precoding). In a case that domains in a cell differ from one another in an essential information block (essential information message) transmitted, information enabling identification of the position in a frame in time (a subframe number including the essential information block (essential information message), for example) may be included. Thus, information may be included for determining each of subframe numbers for transmitting respective essential information blocks (essential information messages) using indices of different base station transmission beams. Moreover, the essential information may include information needed for connection to the cell or for mobility.

The PCCH is used to transmit Uplink Control Information (UCI) in a case of uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include Hybrid Automatic Repeat reQuest ACKnowledgment (HARQ-ACK). The HARQ-ACK indicated may be a HARQ-ACK for downlink data (Transport block, Medium Access Control Protocol Data Unit (MAC PDU), or Downlink-Shared CHannel (DL-SCH)).

The PCCH is used to transmit downlink control information (DCI) in a case of downlink radio communication (radio communication from the base station apparatus 3 to the terminal apparatus 1). Here, one or more pieces of DCI (which may be referred to as DCI formats) are defined for transmission of the downlink control information. In other words, a field for the downlink control information is defined as DCI and is mapped to information bits.

For example, the DCI may be defined to include information for indicating whether a signal included in a scheduled PSCH corresponds to downlink radio communication or uplink radio communication.

For example, the DCI may be defined to include information for indicating a downlink transmission period included in a scheduled PSCH.

For example, the DCI may be defined to include information for indicating an uplink transmission period included in a scheduled PSCH.

For example, the DCI may be defined to include information for indicating a timing for transmitting HARQ-ACK with respect to a scheduled PSCH (for example, the number of symbols from the last symbol included in the PSCH to the symbol for transmission of the HARQ-ACK).

For example, the DCI may be defined to include information for indicating a downlink transmission period, a gap, and an uplink transmission period included in a scheduled PSCH.

For example, the DCI may be defined to be used for the scheduling of a downlink radio communication PSCH in a cell (transmission of a downlink transport block).

For example, the DCI may be defined to be used for the scheduling of an uplink radio communication PSCH in a cell (transmission of an uplink transport block) is defined.

Here, the DCI includes information about the scheduling of the PSCH in a case that the PSCH includes the uplink or the downlink. Here, the DCI for the downlink is also referred to as downlink grant or downlink assignment. Here, the DCI for the uplink is also referred to as uplink grant or uplink assignment.

The PSCH is used to transmit uplink data (Uplink Shared CHannel (UL-SCH)) or downlink data (Downlink Shared CHannel (DL-SCH)) from Medium Access Control (MAC). Furthermore, for the downlink, the PSCH is used to transmit System Information (SI), Random Access Response (PAR), and the like. For the uplink, the PSCH may be used to transmit the HARQ-ACK and/or CSI along with the uplink data. Furthermore, the PSCH may be used to transmit the CSI only or the HARQ-ACK and CSI only. In other words, the PSCH may be used to transmit the UCI only.

Here, the base station apparatus 3 and the terminal apparatus 1 exchange (transmit and/or receive) signals with each other in their respective higher layers. For example, the base station apparatus 3 and the terminal apparatus 1 may transmit and receive radio resource control (RRC) signaling (also referred to as RRC message or RRC information) in the RRC layer, respectively. The base station apparatus 3 and the terminal apparatus 1 may transmit and receive a Medium Access Control (MAC) control element in a MAC layer, respectively. Here, the RRC signaling and/or the MAC control element is also referred to as higher layer signaling. This higher layer means a higher layer relative to a physical layer, and thus may include one or more of a MAC layer, an RRC layer, an RLC layer, a PDCP layer, a NAS layer, and the like. For example, a higher layer in processing in a MAC layer may include one or more of an RRC layer, an RLC layer, a PDCP layer, a NAS layer, and the like.

The PSCH may also be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1. The PSCH may be used to transmit UE capabilities in the uplink.

Although the same designations PCCH and PSCH are commonly used for the downlink and the uplink, different channels may be defined for the downlink and for the uplink. For example, a downlink shared channel may be referred to as a Physical Downlink Shared CHannel (PDSCH). For example, an uplink shared channel may be referred to as a Physical Uplink Shared CHannel (PUSCH). A downlink control channel may be referred to as a Physical Downlink Control CHannel (PDCCH). An uplink control channel may be referred to as a Physical Uplink Control CHannel (PUCCH).

The PRACH may be used to transmit a random access preamble. The PRACH is used for indicating the initial connection establishment procedure, the handover procedure, the connection re-establishment procedure, synchronization (timing adjustment) for uplink transmission, and a request for an uplink PSCH (UL-SCH) resource.

In FIG. 1, the following downlink physical signals are used for downlink radio communication. Here, the downlink physical signals are not used to transmit the information output from the higher layers but is used by the physical layer.

Synchronization Signal (SS)
Reference Signal (RS)

The synchronization signal is used for the terminal apparatus 1 to take synchronization in the frequency domain and the time domain in the downlink. The synchronization signal may include a Primary Synchronization Signal (PSS) and a Secondary Synchronization Signal (SSS). The synchronization signal may be used for the terminal apparatus 1 to identify a cell IDentifier (cell ID). The synchronization signal may also be used to select/identify/determine a base station transmission beam to be used by the base station apparatus 3 for downlink beamforming, and/or a terminal reception beam to be used by the terminal apparatus 1. In other words, the synchronization signal may be used to allow the terminal apparatus 1 to select/identify/determine the index of the base station transmission beam applied to the downlink signal by the base station apparatus 3.

The downlink reference signal (hereinafter, also simply referred to as a reference signal in the present embodiment) may be classified into a plurality of reference signals based on applications and the like. For example, one or more of the following reference signals may be used for the reference signal.

Demodulation Reference Signal (DMRS)
Channel State Information Reference Signal (CSI-RS)
Phase Tracking Reference Signal (PTRS)
Mobility Reference Signal (MRS)

The DMRS may be used for channel compensation at the time of demodulation of the received modulated signal. DMRS for demodulating PSCH, DMRS for demodulating PCCH, and/or DMRS for demodulating PBCH may be collectively referred to as DMRS, or may be individually defined.

CSI-RS may be used for channel state measurement. PTRS may be used for phase tracking based on a movement of the terminal and the like. MRS may be used to measure reception quality from multiple base station apparatuses for handovers.

A reference signal for compensating for phase noise may also be defined as the reference signal.

However, functions of at least some of the plurality of reference signals may be provided to other reference signals.

At least one of the plurality of reference signals described above or the other reference signals may be defined as a Cell-specific reference signal (CRS) individually set for a cell, a Beam-specific reference signal (BRS) for each transmission beam used by the base station apparatus 3 or the transmission reception point 4, and/or a UE-specific reference signal (URS) individually set to the terminal apparatus 1.

Furthermore, at least one of the reference signals may be used for a numerology for a radio parameter, subcarrier spacing, or the like, or may be used for fine synchronization sufficient to achieve FFT window synchronization.

At least one of the reference signals may be used for Radio Resource Measurement (RRM). At least one of the reference signals may be used for beam management.

A synchronization signal may be used for at least one of the reference signals.

The subframe will be described below. The subframe in the embodiment may also be referred to as a resource unit, a radio frame, a time period, or a time interval.

Figure 2:
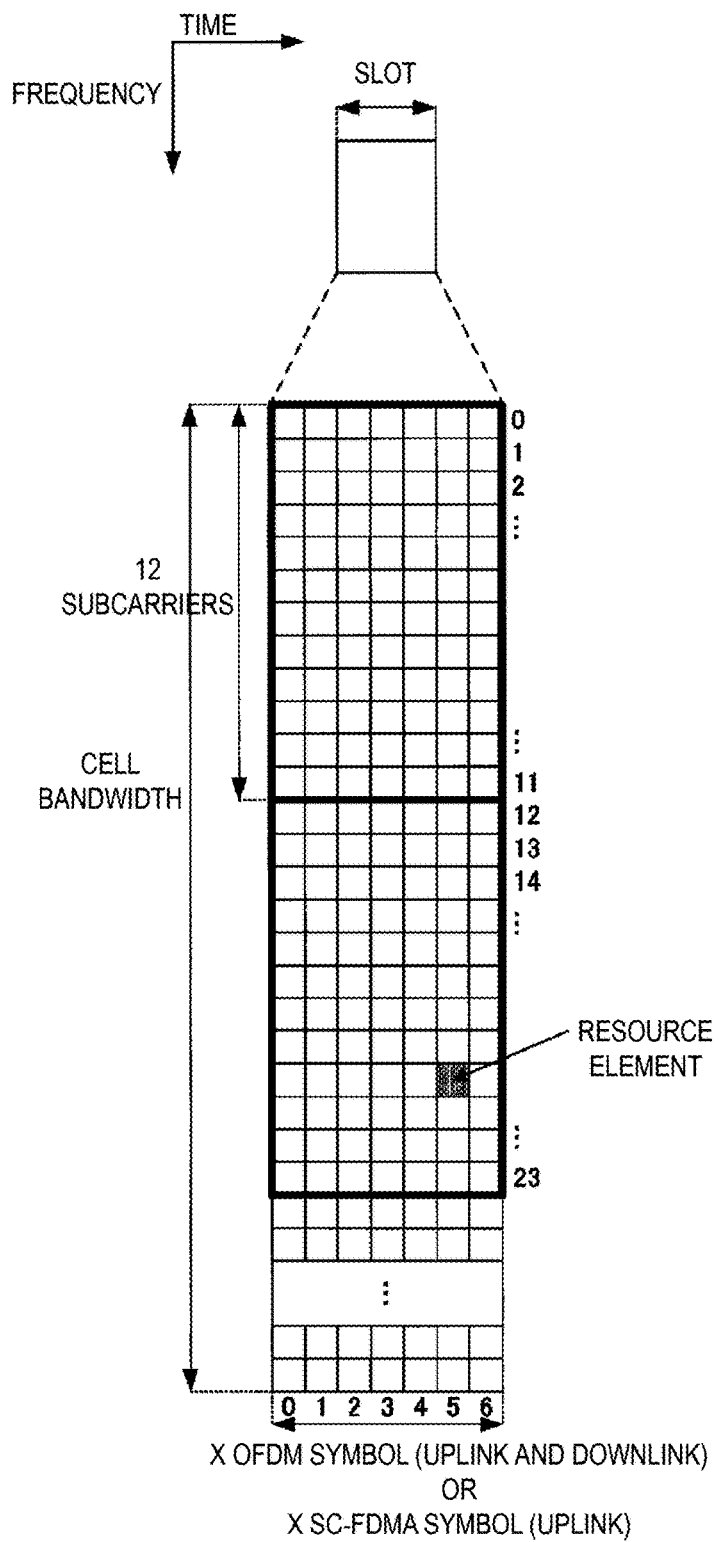
FIG. 2 is a diagram illustrating a schematic configuration of a downlink slot according to an embodiment of the present invention.

FIG. 2 is a diagram illustrating a schematic configuration of a downlink slot according to the present embodiment. Each of the radio frames is 10 ms in length. Each of the radio frames is constituted of 10 subframes and X slots. In other words, each subframe has a length of 1 ms. The length of each of the slots is defined by subcarrier spacing. For example, in a case of Normal Cyclic Prefix (NCP) with the subcarrier spacing of OFDM symbols being 15 kHz, X is 7 or 14 respectively corresponding to 0.5 ms or 1 ms. In addition, in a case where the subcarrier spacing is 60 kHz, X is 7 or 14 respectively corresponding to 0.125 ms or 0.25 ms. FIG. 2 illustrates an example of a case where X is 7. Note that the case can be similarly extended to a case where X is 14. The uplink slot may be defined similarly, and the downlink slot and the uplink slot may be defined separately from one another.

The signal or the physical channel transmitted in each of the slots may be expressed by a resource grid. The resource grid is defined by a plurality of subcarriers and a plurality of OFDM symbols. The number of subcarriers constituting one slot depends on a cell bandwidth in each of an uplink and a downlink. Each element within the resource grid is referred to as a resource element. The resource element may be identified by a subcarrier number and an OFDM symbol number.

A resource block is used to express mapping of a certain physical downlink or uplink channel (such as the PDSCH or the PUSCH) to resource elements. For the resource block, a virtual resource block and a physical resource block are defined. A certain physical uplink channel is first mapped to a virtual resource block. Thereafter, the virtual resource block is mapped to the physical resource block. In the case of NCP with the number of OFDM symbols X included in a slot being 7, one physical resource block is defined by seven consecutive OFDM symbols in the time domain and by 12 consecutive subcarriers in the frequency domain. Hence, one physical resource block includes (7×12) resource elements. In a case of Extended CP (ECP), one physical resource block is defined by six consecutive OFDM symbols in the time domain and by 12 consecutive subcarriers in the frequency domain. Hence, one physical resource block includes (6×12) resource elements. In this case, one physical resource block corresponds to one slot in the time domain and corresponds to 180 kHz in the frequency domain. Physical resource blocks are numbered from 0 in the frequency domain.

Figure 3:
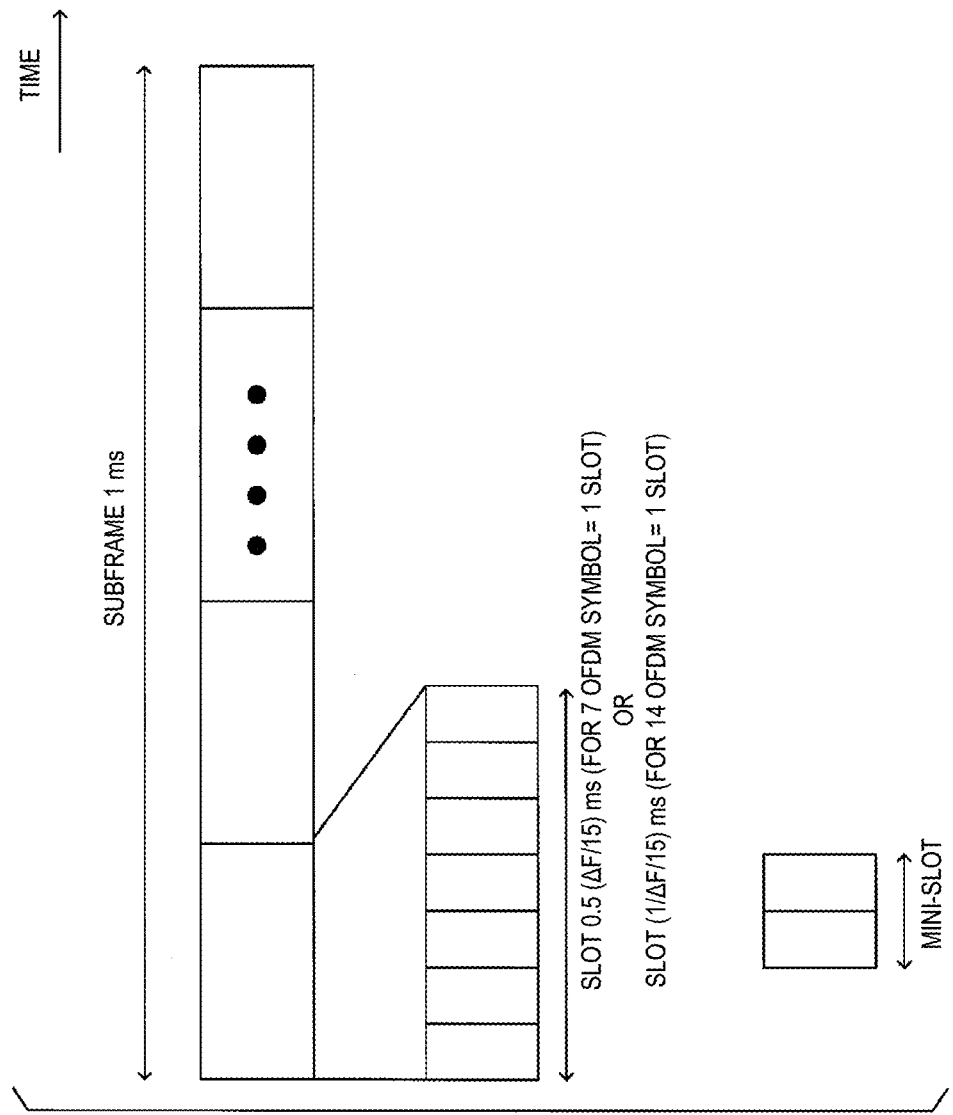
FIG. 3 is a diagram illustrating relationship among a subframe, a slot, and a mini-slot in a time domain, according to an embodiment of the present invention.

A subframe, a slot, and a mini-slot will now be described. FIG. 3 is a diagram illustrating the relationship among a subframe, a slot, and a mini-slot in a time domain. As illustrated in the figure, three types of time units are defined. The subframe is 1 ms regardless of the subcarrier spacing, whereas the slot includes 7 or 14 OFDM symbols and has a slot length depending on the subcarrier spacing. Specifically, in a case that the subcarrier spacing is 15 kHz, a single subframe includes 14 OFDM symbols. Thus, in a case that the subcarrier spacing is $\Delta f$ (kHz), the slot length may be defined as $0.5/(\Delta f/15)$ ms in a case where a single slot includes seven OFDM symbols. This $\Delta f$ may be defined by subcarrier spacing (kHz). The slot length may be defined as $1/(\Delta f/15)$ ms in a case where a single slot includes seven OFDM symbols. This $\Delta f$ may be defined by subcarrier spacing (kHz). Furthermore, the slot length may be defined as $X/14/(\Delta f/15)$ ms, where X is the number of OFDM symbols in a slot.

The mini-slot (which may be referred to as a sub-slot) is a time unit including OFDM symbols of which the number is less than the number of OFDM symbols included in the slot. The figure illustrates an example of a case where the mini-slot is constituted of 2 OFDM symbols. The OFDM symbols in the mini-slot and the OFDM symbols in the slot may match in timing. Note that a slot or mini-slot may be the minimum scheduling unit.

Figure 4:
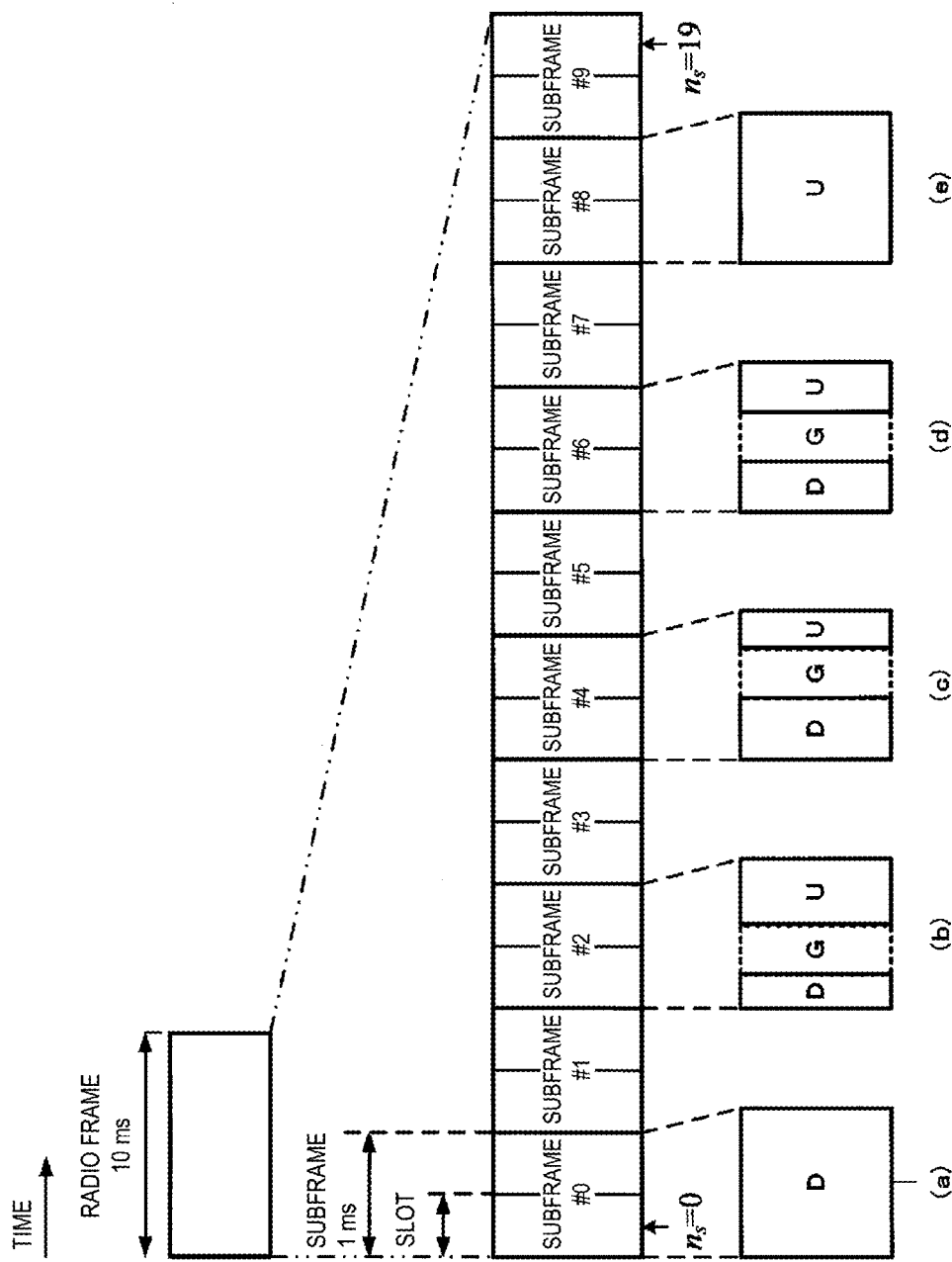
FIG. 4 is a diagram illustrating an example of a slot or a subframe according to an embodiment of the present invention.

FIG. 4 illustrates an example of a slot or a subframe. Here, an example of a case is illustrated in which the slot length is 0.5 ms with the subcarrier interval being 15 kHz. In the figure, D represents the downlink, and U represents the uplink. As illustrated in the figure, during a certain time interval (for example, the minimum time interval to be allocated to a UE in the system), the subframe may include one or more of the followings:

a downlink part (duration);

a gap; and an uplink part (duration).

Part (a) of FIG. 4 illustrates an example in which the entire subframe is used for downlink transmission during a certain time interval (for example, a minimum time resource unit that can be allocated to a UE, which may also be referred to as a time unit. Furthermore, a combination of a plurality of minimum time resource units may be referred to as a time unit). Part (b) of FIG. 4 illustrates an example in which an uplink is scheduled via a PCCH for example by using the first time resource, and an uplink signal is transmitted after a gap for a processing delay of the PCCH, a time for switching from a downlink to an uplink, and generation of a transmit signal. Part (c) of FIG. 4 illustrates an example in which a downlink PCCH and/or downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the HARQ-ACK and/or CSI, namely, the UCI. Part (d) of FIG. 4 illustrates an example in which a downlink PCCH and/or a downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the uplink data, namely, the UL-SCH. Part (e) of FIG. 4 illustrates an example in which the entire subframe is used for uplink transmission (uplink PSCH or PCCH).

The above-described downlink part and uplink part may be constituted of multiple OFDM symbols as is the case with LTE.

Beamforming, beamforming, beam management and/or beam weaving according to embodiments of the present invention will be described.

The beamforming on a transmission side (the base station apparatus 3 in a case of downlink and the terminal apparatus 1 in a case of an uplink) is a method of controlling an analog or digital amplitude/phase for each of a plurality of transmission antenna elements to transmit a signal with a high transmission antenna gain in a desired direction, and a relevant field pattern is referred to as a transmission beam. The beamforming on a reception side (the terminal apparatus 1 in a case of downlink and the base station apparatus 3 in a case of an uplink) is processing of controlling an analog or digital amplitude/phase for each of a plurality of reception antenna elements to receive a signal with a high transmission antenna gain in a desired direction, and a field pattern involved in this method is referred to as a reception beam. Beam management may be an operation performed by the base station apparatus 3 and/or the terminal apparatus 1 for directivity alignment for the transmission beam and/or reception beam and for obtaining a beam gain.

Figure 5:
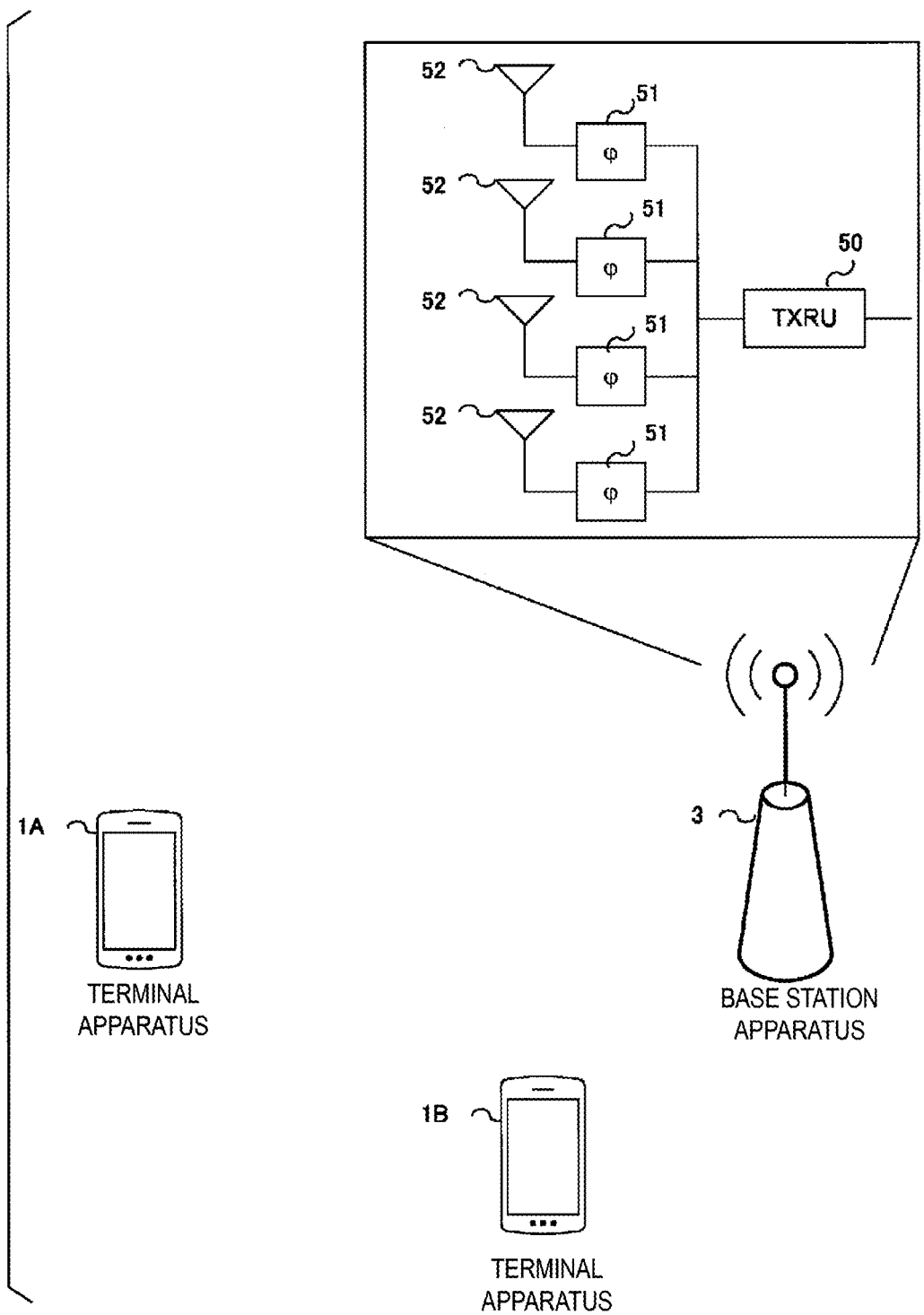
FIG. 5 is a diagram illustrating an example of beamforming according to an embodiment of the present invention.

FIG. 5 illustrates an example of the beamforming. A plurality of antenna elements are connected to a single transmitter (Transmission Unit (TXRU)) 50, and a beam can be directed to a desired direction for a transmission signal with the antenna elements 52 performing transmission with a phase shifter 51 of each of the antenna elements performing phase control. Typically, the TXRU 50 may be defined as an antenna port, and only the antenna port may be defined in the terminal apparatus 1. The directivity in a desired direction can be obtained by controlling the phase shifter 51, whereby the base station apparatus 3 can communicate with the terminal apparatus 1 using a beam with a high gain.

The beamforming may also be referred to as virtualization, precoding, weight multiplication, and the like. A signal itself transmitted with the beamforming may be simply referred to as a transmission beam.

In the present embodiment, a transmission beam used by the terminal apparatus 1 in the beamforming for uplink transmission is referred to as an uplink transmission beam (UL Tx beam), and a reception beam used by the base station apparatus 3 in the beamforming for uplink reception is referred to as an uplink reception beam (UL Rx beam). A transmission beam used by the base station apparatus 3 in the beamforming for downlink transmission is referred to as a downlink transmission beam (DL Tx beam), and a reception beam used by the terminal apparatus 1 in the beamforming for downlink reception is referred to as a downlink reception beam (DL Rx beam). Note that the uplink transmission beam and the uplink reception beam may be collectively referred to as an uplink beam, and the downlink transmission beam and the downlink reception beam may be collectively referred to as a downlink beam. Note also that processing performed by the terminal apparatus 1 for uplink beamforming may be referred to as uplink transmission beam processing or uplink precoding, and processing performed by the base station apparatus 3 for uplink beamforming may be referred to as uplink reception beam processing. Note also that processing performed by the terminal apparatus 1 for downlink beamforming may be referred to as downlink reception beam processing, and processing performed by the base station apparatus 3 for downlink beamforming may be referred to as downlink transmission beam processing or downlink precoding.

The base station apparatus 3 may transmit a signal using a plurality of downlink transmission beams with a single OFDM symbol. For example, an antenna element of the base station apparatus 3 may be divided into sub-arrays, and the downlink beamforming may be performed differently among the sub-arrays. A polarized antenna may be used and the downlink beamforming may be performed differently among polarized waves. Similarly, the terminal apparatus 1 may transmit a signal by using a plurality of uplink transmission beams with a single OFDM symbol.

Note that in the present embodiment, the base station apparatus 3 in a cell including the base station apparatus 3 and/or the transmission reception point 4 uses a downlink transmission beam by switching among a plurality of downlink transmission beams, but a cell may be individually formed for each downlink transmission beam.

The beam management may include the following operations.

Beam selection
Beam refinement
Beam recovery

For example, the beam selection may be an operation of selecting a beam in communication between the base station apparatus 3 and the terminal apparatus 1. The beam refinement may be an operation of selecting a beam with a higher gain, or an operation of changing the optimum beam between the base station apparatus 3 and the terminal apparatus 1 in response to a movement of the terminal apparatus 1. The beam recovery may be an operation of reselecting a beam in response to degradation of the quality of a communication link for communications between the base station apparatus 3 and the terminal apparatus 1, as a result of blockage due to a shielding object or a person passing by.

For example, the terminal apparatus 1 may select a transmission beam for the base station apparatus 3, by using a reference signal (CSI-RS for example), or Quasi Co-Location (QCL) assumption.

In a case where a Long Term Property of a channel for conveying a certain symbol in a certain antenna port can be inferred from a channel for conveying a certain symbol in another antenna port, these two antenna ports are said to be quasi co-located. The Long Term Property of a channel includes one or more of delay spread, Doppler spread, Doppler shift, average gain, and average delay. For example, an antenna port 1 and an antenna port 2 that are quasi co-located in terms of average delay indicate that the reception timing of the antenna port 2 may be inferred from the reception timing of the antenna port 1.

This QCL may be extended for the beam management. Thus, a QCL extended to space may be newly defined. Examples of the Long Term Property of a channel in spatial QCL assumption may include an Angle of Arrival (AoA) or a Zenith angle of Arrival (ZoA), an Angle Spread (an Angle Spread of Arrival (ASA) or a Zenith angle Spread of Arrival (ZSA) for example), an Angle of Delivery (AoD or ZoD for example) and their Angle Spreads (for example, Angle Spread of Departure (ASD), Zenith angle Spread of Departure (ZSS)), and Spatial Correlation in a wireless link or a channel.

Thus, an operation of the base station apparatus 3 and the terminal apparatus 1 equivalent to the beam management based on spatial QCL assumption and wireless resource (time and/or frequency) may be defined as the beam management.

Note that an antenna port may be allocated to each precoding or transmission beam. For example, a signal transmitted by using different precoding or a different transmission beam in the present embodiment may be defined as a signal transmitted by one or a plurality of different antenna ports. Note that the antenna port is defined as follows. Specifically, a channel over which a certain symbol is transmitted with a certain antenna port can be inferred from a channel over which another symbol is transmitted with the same antenna port. The same antenna port may be an antenna port with the same number (the number for identifying an antenna port). A plurality of antenna ports may form an antenna port set. The same antenna port may be an antenna port set with the same number (the number for identifying an antenna port set). Transmission of a signal by applying a different terminal transmission beam may be transmission of a signal using a different antenna port or a different antenna port set including a plurality of antenna ports. Each beam index may be an OFDM symbol number, an antenna port number, or an antenna port set number.

In transform precoding, a complex modulation symbol for one or a plurality of layers generated by layer mapping is input. The transform precoding may be processing that divides a complex number symbol block into sets for respective layers corresponding to a single OFDM symbol. In a case that the OFDM is used, Discrete Fourier Transform (DFT) processing in the transform precoding may not be required. Precoding may be processing that generates a vector block to be mapped to a resource element, with a vector block obtained from a transform precoder used as an input. In a case of spatial multiplexing, one precoding matrix may be applied in generating the vector block to be mapped to the resource element. This processing may be referred to as digital beamforming. The precoding may be defined to include analog beamforming and digital beamforming, and may be defined as digital beamforming. The beamforming may be applied to a precoded signal, or the precoding may be applied to a signal to which the beamforming has been applied. The beamforming may include the analog beamforming and not including the digital beamforming, or may include both the digital beamforming and the analog beamforming. A signal after beamforming, precoding, or beamforming and precoding may be referred to as a beam. An index of a beam may be an index of a precoding matrix. A beam index and a precoding matrix index may be independently defined. A signal may be generated with a precoding matrix indicated by the precoding matrix index applied to a beam indicated by the beam index. A signal may be generated with the beamforming indicated by a beam index applied to a signal to which a precoding matrix indicated by the precoding matrix index has been applied. The digital beamforming may be processing of applying different precoding matrices to a resource (a subcarrier set for example) in a frequency direction.

A cell selection procedure performed by the terminal apparatus 1 according to the present embodiment will now be described.

Figure 6:
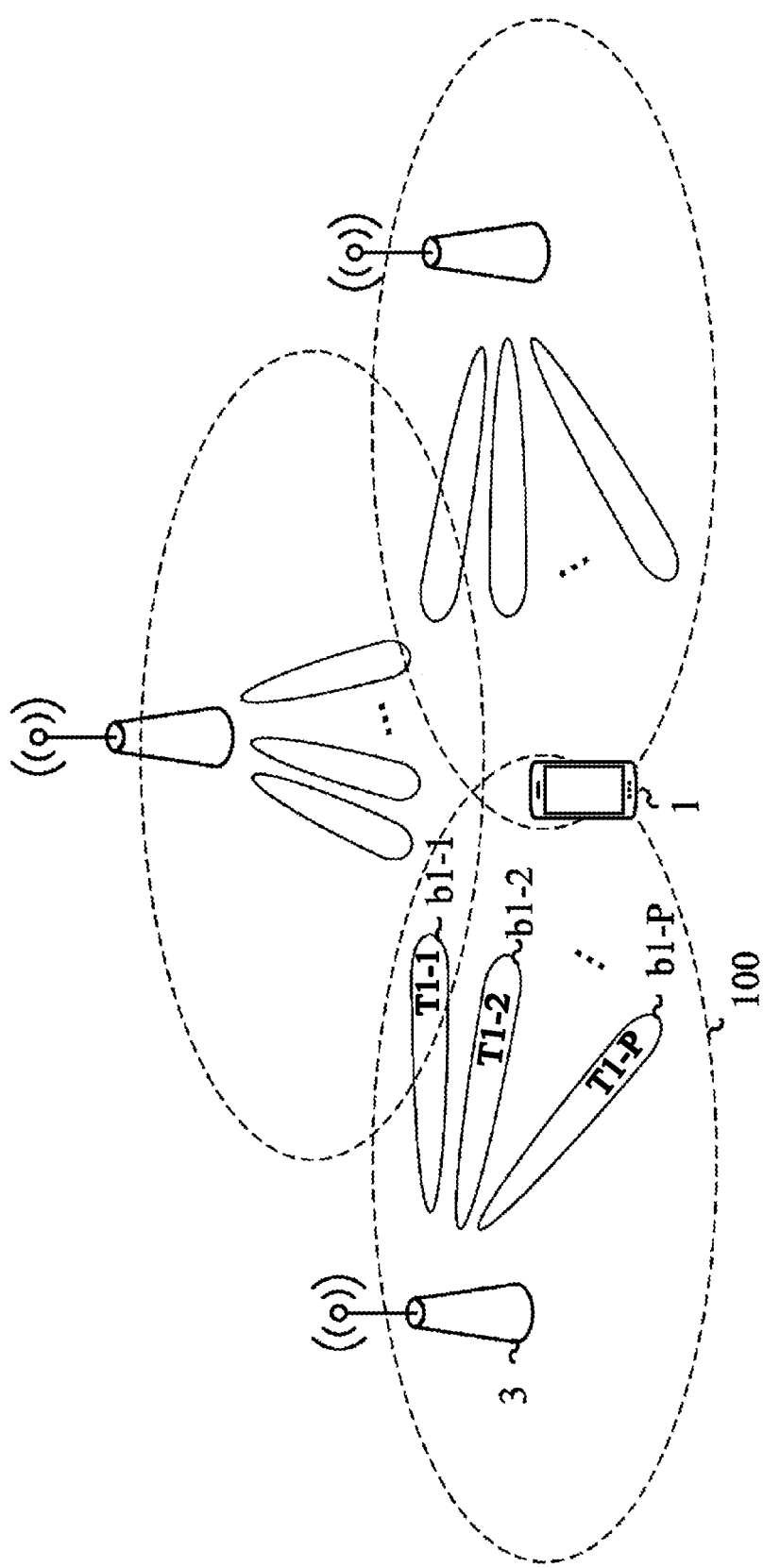
FIG. 6 is a diagram illustrating a concept in which a plurality of reference signals to which a transmission beam is applied are transmitted in one or a plurality of cells, according to an embodiment of the present invention.

FIG. 6 illustrates a state where the terminal apparatus 1 is receiving a plurality of reference signals, to which transmission beams independent from each other have been applied, from the plurality of base station apparatuses 3. For example, the terminal apparatus 1 receives a plurality of reference signals T1-1 to T1-P, for which transmission beams b1-1 to b1-P have been used, from the base station apparatuses 3 forming respective cells 100. A procedure performed by the terminal apparatus 1 to select a cell (the cell 100 for example) as a cell suitable for camping (suitable cell) is described with reference to a flowchart in FIG. 8.

Figure 8:
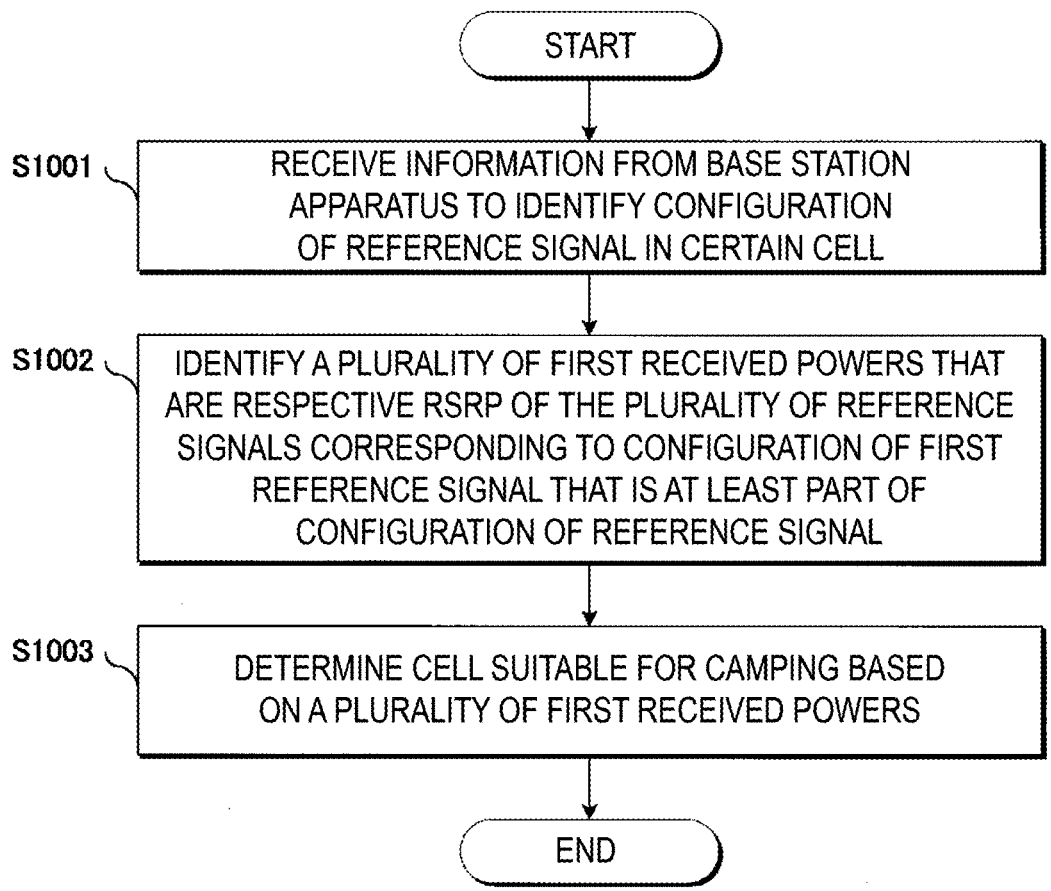
FIG. 8 is a flowchart illustrating a procedure performed by the terminal apparatus 1 according to an embodiment of the present invention to select a certain cell as a cell suitable for camping.

In step S1001 in FIG. 8, the terminal apparatus 1 receives, from one or a plurality of base stations 3, information for identifying the configuration of a plurality of reference signals corresponding to each of one or a plurality of cells, through a synchronization signal, system information, and/or an upper layer signal. In step S1001 in FIG. 8, the terminal apparatus 1 may identify the configuration of the plurality of reference signals corresponding to one or a plurality of respective cells, not based on the information for identifying the configuration of a plurality of reference signals corresponding to one or a plurality of respective cells.

An example of the information for identifying the configuration of the plurality of reference signals may include information for identifying the configuration of a plurality of time and/or frequency resources, allocated to the respective reference signals transmitted using a plurality of transmission beams. For example, the information for identifying a plurality of time and/or frequency resources allocated to the reference signals may be a cell identifier (Cell ID) and/or beam identifier (Beam ID). For example, the information for identifying time and/or frequency resources allocated to the reference signals may be information indicating the corresponding resource with a bitmap. An example of the information for identifying the configuration of a plurality of reference signals may be information for identifying a sequence of each of the reference signals transmitted using a plurality of transmission beams.

Another example of the information for identifying the configuration of a plurality of reference signals may be information for identifying an antenna port number to which each of the reference signals using a plurality of transmission beams is allocated.

The terminal apparatus 1 may implicitly identify the configuration of a plurality of reference signals, from a signal received from the base station apparatus 3. For example, based on a resource and/or a sequence with which a certain reference signal has been received, the terminal apparatus 1 may identify the configuration (such as a beam identifier or a system for example) of the reference signal.

Based on the configuration of the plurality of reference signals identified, the terminal apparatus 1 receives a corresponding plurality of reference signals.

In step S1002 in FIG. 8, to select the cell suitable for camping, the terminal apparatus 1 measures/identifies reference signal received power (RSRP) of each of a plurality of reference signals corresponding to at least a part of the configuration of the plurality of reference signals in each cell (for example, each corresponding configuration is referred to as reference signal configuration A) (each RSRP corresponding to each reference signal configuration A is referred to as received power $P_A$) and/or reference signal received quality (RSRQ) (for example, each RSRQ corresponding to the reference signal configuration A is referred to as received quality $Q_A$). For example, the RSRP and/or RSRQ may be measured/identified for each of a plurality of time/frequency resources and/or a plurality of antenna ports corresponding to a plurality of reference signals transmitted from a cell.

The reference signals received based on the configuration of the reference signals may be synchronization signals, for example.

FIG. 7 illustrates an example of a state where the terminal apparatus 1 has received information for identifying the configurations (reference signal configurations A) of three reference signals in a certain cell. The reference signal corresponding to Configuration 1 identified from the information received by the terminal apparatus 1 indicates that the frequency and/or time resource is allocated to a resource 1, and the corresponding received power $P_A$ is the RSRP in the resource 1. The reference signal corresponding to Configuration 2 identified from the information received by the terminal apparatus 1 indicates that the frequency and/or time resource is allocated to a resource 2, and the corresponding received power $P_A$ is the RSRP in the resource 2. The reference signal corresponding to Configuration 3 identified from the information received by the terminal apparatus 1 indicates that the frequency and/or time resource is allocated to a resource 3, and the corresponding received power $P_A$ is the RSRP in the resource 3.

In step S1003 in FIG. 8, the terminal apparatus 1 selects the cell suitable for camping, based on one or a plurality of received powers $P_A$ measured/identified in each cell and/or one or a plurality of received qualities $Q_A$ measured/identified in each of the cells. For example, the terminal apparatus 1 may calculate a reference value $R_P$ for each cell, based on the plurality of received powers $P_A$ measured/identified for each of the cells. The terminal apparatus 1 may calculate a reference value $R_Q$ based on the plurality of received qualities $R_Q$ measured/identified for each of the cells. For example, the terminal apparatus 1 may select the cell suitable for camping, based on the reference value $R_P$ and/or the reference value $R_Q$ calculated for each of the cells.

For example, the terminal apparatus 1 searches the supporting frequency band for the strongest cell (a cell with the highest first reference value for example), and selects and camps on the cell in a case that the cell is suitable for camping. Note that the cell suitable for camping is a cell that satisfies a predetermined cell selection standard, and is available for the camping. The predetermined cell selection standard may be defined based on whether or not a first reference value is equal to or larger than a predetermined threshold, and/or whether a second reference value is equal to or larger than a predetermined threshold, for example.

In a case that the base station apparatuses 3 forming a certain cell transmits a plurality of reference signals using different downlink transmission beams (and/or in a case that the terminal apparatus 1 receives a plurality of reference signals by using a plurality of downlink reception beams), the RSRP of the reference signals received by the terminal apparatus 1 depends on the beam gain corresponding to the downlink transmission beams (and/or downlink reception beams) used. Thus, what is important is how the terminal apparatus 1 selects and/or reselects the cell suitable for camping, in a case of receiving reference signals using a plurality of downlink transmission beams (and/or downlink reception beams).

For example, the terminal apparatus 1 selects, from received powers $P_A(1)$ to $P_A(P)$ of reference signals T1-1 to T1-P in the cells 100 received from the base station apparatuses 3, the highest value as a reference value $R_P$ of each of the cells 100. The terminal apparatus 1 may send a measurement report on the calculated reference value $R_P$ of the cell 100 to the base station apparatus 3 as a feedback. The terminal apparatus 1 in this example selects the cell based on the RSRP of a case where the base station apparatus 3 uses the best transmission beam (best Tx beam) and/or the best reception beam (best Rx beam) in the cell, and thus a high beam gain in the downlink signal in the selected cell can be obtained.

In another example, the terminal apparatus 1 sets a value obtained by averaging the received powers $P_A(1)$ to $P_A(P)$ of the respective reference signals T1-1 to T1-P in the cell 100 received from the base station apparatus 3, as the reference value $R_P$ of the cell 100. The terminal apparatus 1 may send a measurement report on the calculated reference value $R_P$ of the cell 100 to the base station apparatus 3 as a feedback. In a case that the reception performance is compromised by blockage and the like of the transmission beam used for transmitting a downlink signal in the camped cell, the terminal apparatus 1 can switch to another good transmission beam and/or reception beam in the same cell, that is, without reselecting a cell.

In another example, the terminal apparatus 1 sets the reference value $R_P$ of the cell 100 as a value obtaining by averaging N highest values in the received powers $P_A(1)$ to $P_A(P)$ of the respective reference signals T1-1 to T1-P in the cell 100 received from the base station apparatus 3. The terminal apparatus 1 may send a measurement report on the calculated reference value $R_P$ of the cell 100 to the base station apparatus 3 as a feedback. The terminal apparatus 1 in this example can select and/or reselect a cell without being affected by a transmission beam and/or reception beam with a poor reception performance in the same cell, and thus can switch to another good transmission beam and/or reception beam in the same cell.

A procedure of transmitted power control for determining transmitted power of an uplink signal and/or uplink channel transmitted in a serving cell that is a cell including the terminal apparatus 1 according to the present embodiment is described with reference to a flowchart in FIG. 9.

Figure 9:
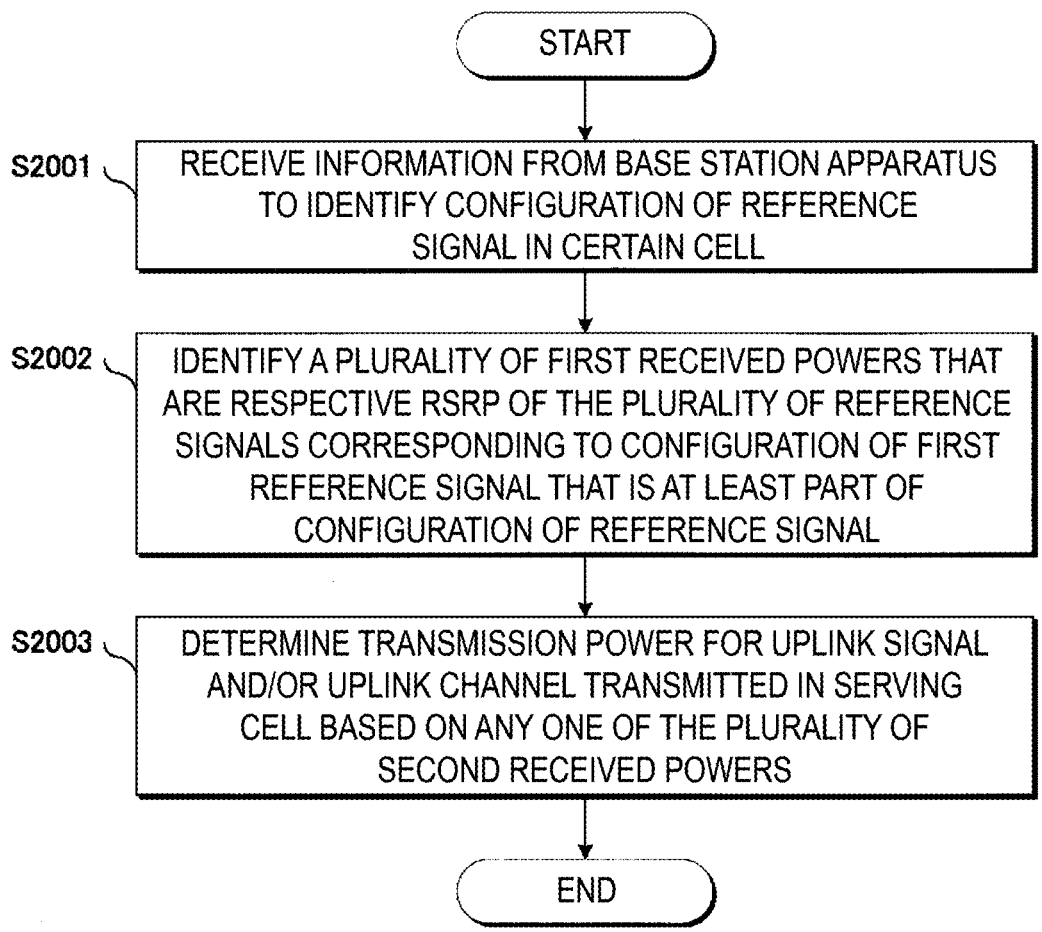
FIG. 9 is a flowchart illustrating a transmission power control procedure for determining the transmitted power of an uplink signal and/or uplink channel transmitted by the terminal apparatus 1 according to an embodiment of the present invention in a serving cell.

In step S2001 in FIG. 9, the terminal apparatus 1 receives, from the base station apparatus 3, information for identifying the configuration of a plurality of reference signals corresponding to a certain cell, through a synchronization signal, system information, and/or an upper layer signal.

In step S2002 in FIG. 9, the terminal apparatus 1 calculates a path loss in the serving cell, by measuring/identifying RSRP (referred to as a received power $P_B$ for example) and/or RSRQ (referred to as a received quality $Q_B$ for example) of each of one or a plurality of reference signals corresponding to at least a part of configurations of a plurality of reference signals in the serving cell (each corresponding configuration may be referred to as a reference signal configuration B for example). For example, the terminal apparatus 1 may measure/identify each of a plurality of time/frequency resources and/or the RSRP and/or RSRQ at a plurality of antenna ports corresponding to a plurality of reference signals transmitted from the cell. For example, the terminal apparatus 1 may measure/identify a single RSRP and/or RSRQ corresponding to a single reference signal configuration B indicated by a signal (such as an upper layer signal or a control channel for example) from the based station apparatus 3.

In step S2003 in FIG. 9, the terminal apparatus 1 determines the transmitted power of the uplink signal and/or uplink channel transmitted in the serving cell, based on any one of one or a plurality of received powers $P_B$ measured/identified. For example, the terminal apparatus 1 calculates a downlink path loss between the terminal apparatus 1 and the base station apparatus 3 in the serving cell, based on any one of one or a plurality of received powers $P_B$ measured/identified. The terminal apparatus 1 may calculate the downlink path loss based on the highest value in the plurality of received powers $P_B$ based on the plurality of second configurations specified. Note that the path loss may be calculated for each of the plurality of received powers $P_B$ measured/identified, and the smallest value may be set as the path loss in the serving cell. For example, the path loss may be calculated by Formula (1).

$$PL = \text{ReferenceSignalPower} - \text{higherlayerfilteredRSRP} \quad \text{Formula (1)}$$

Note that ReferenceSignalPower represents the transmitted power of a reference signal corresponding to the reference signal configuration B and may be identified based on information notified through an upper layer signal or a downlink control channel. Note that higherlayerfiltered RSRP is the received power $P_B$ measured/identified based on the reference signal configuration B, and may be received power as a result of performing filtering processing by an upper layer on a measurement value in a physical layer. The value of the downlink path loss calculated by Formula (1) is assumed to be approximately the same as an uplink path loss, and thus is used for compensating for the uplink path loss.

The terminal apparatus 1 determines transmitted power used for transmitting an uplink signal and/or uplink channel transmitted based on the calculated path loss. For example, transmitted power for PSCH transmitted by the terminal apparatus 1 may be calculated by Formula (2).

$$P_{PSCH} = \min\{P_{CMAX}, 10\log_{10}(M_{PSCH}) + P_{O\_PSCH} + \alpha \cdot PL + \Delta_{TF} + f\} \quad \text{Formula (2)}$$

$P_{CMAX}$ represents the maximum transmitted power of the terminal apparatus 1. $M_{PSCH}$ represents the transmission bandwidth. $P_{O\_PSCH}$ represents a reference received power for PSCH. $\alpha$ is a path loss coefficient used for the fractional transmitted power control of the entire cell. $\Delta_{TF}$ is a parameter dependent on an uplink signal modulation coding scheme (MCS: Modulation and Coding Schemes). f is a value for correcting excess/shortage of the received power determined by a TPC command notified from the base station apparatus.

Note that the plurality of reference signal configurations A may be the same as the plurality of reference signal configurations B. For example, the plurality of reference signal configurations A and the plurality of reference signal configurations B may be the configurations of the same reference signal. For example, the cell suitable for camping may be determined based on the plurality of received powers $P_A$ that are received powers of the plurality of respective reference signals corresponding to the plurality of reference signal configurations, and the transmitted power of an uplink signal and/or uplink channel transmitted in the serving cell may be determined based on any one of the plurality of received powers $P_A$.

Note that the plurality of reference signal configurations A and the plurality of reference signal configurations B may be configurations for independent reference signals. For example, the reference signal configuration A may be a configuration for the first reference signal, and the reference signal configuration B may be a configuration for the second reference signal. The terminal apparatus 1 may determine the cell suitable for camping based on the plurality of received powers $P_A$ corresponding to a plurality of respective first reference signals corresponding to the plurality of reference signal configurations A, and may determine the transmitted power of an uplink signal and/or uplink channel transmitted in the serving cell based on the received power $P_B$ corresponding to any one of the plurality of second reference signals corresponding to the plurality of reference signal configurations B.

Configurations of apparatuses according to the present embodiment will be described below.

Figure 10:
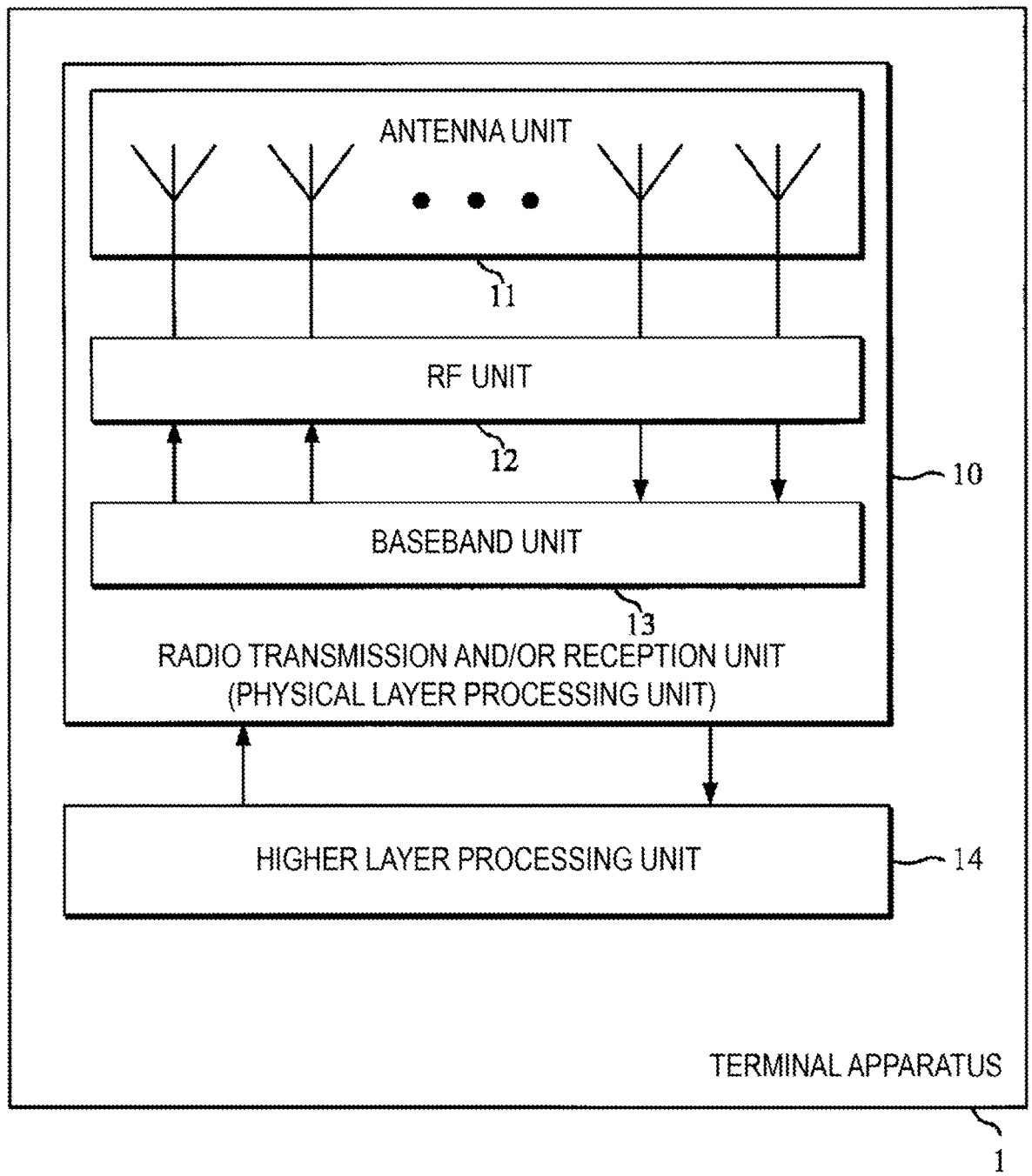
FIG. 10 is a schematic block diagram illustrating a configuration of the terminal apparatus 1 according to an embodiment of the present embodiment.

FIG. 10 is a schematic block diagram illustrating a configuration of the terminal apparatus 1 in the present embodiment. As illustrated, the terminal apparatus 1 is configured to include a radio transmission and/or reception unit 10 and a higher layer processing unit 14. The radio transmission and/or reception unit 10 is configured to include an antenna unit 11, a radio frequency (RF) unit 12, and a baseband unit 13. The radio transmission and/or reception unit 10 is also referred to as a transmitter, a receiver or a physical layer processing unit. The higher layer processing unit 14 is also referred to as a measurement unit or a control unit.

The higher layer processing unit 14 outputs uplink data (which may also be referred to as a transport block) generated by a user operation or the like, to the radio transmission and/or reception unit 10. The higher layer processing unit 14 performs processing for some or all of the Medium Access Control (MAC) layer, the Packet Data Convergence Protocol (PDCP) layer, the Radio Link Control (RLC) layer, and the Radio Resource Control (RRC) layer.

The higher layer processing unit 14 controls transmission of a scheduling request, based on various types of configuration information/parameters.

The higher layer processing unit 14 manages various types of configuration information/parameters of its own apparatus. The higher layer processing unit 14 sets various types of configuration information/parameters based on higher layer signaling received from the base station apparatus 3. Namely, the higher layer processing unit 14 sets the various configuration information/parameters in accordance with the information indicating the various configuration information/parameters received from the base station apparatus 3. The higher layer processing unit 14 may have a function of identifying configurations of a plurality of reference signals in a certain cell based on information received from the base station apparatus 3. The higher layer processing unit 14 may have a function of identifying RSRP of each of the plurality of reference signals corresponding to the plurality of reference signal configurations identified. The higher layer processing unit 14 may have a function of selecting a cell suitable for camping based on the RSRP of the plurality of reference signals.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3. The radio transmission and/or reception unit 10 may have a function of receiving information for identifying configurations of a plurality of reference signals in a certain cell. The radio transmission/reception unit 10 may have a function of receiving a plurality of reference signals based on a plurality of reference signal configurations.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, attaches the CP to the generated OFDM symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. The RF unit 12 may include a function of determining the transmitted power of the uplink signal and/or the uplink channel transmitted in the serving cell. The RF unit 12 is also referred to as a transmit power control unit.

Figure 11:
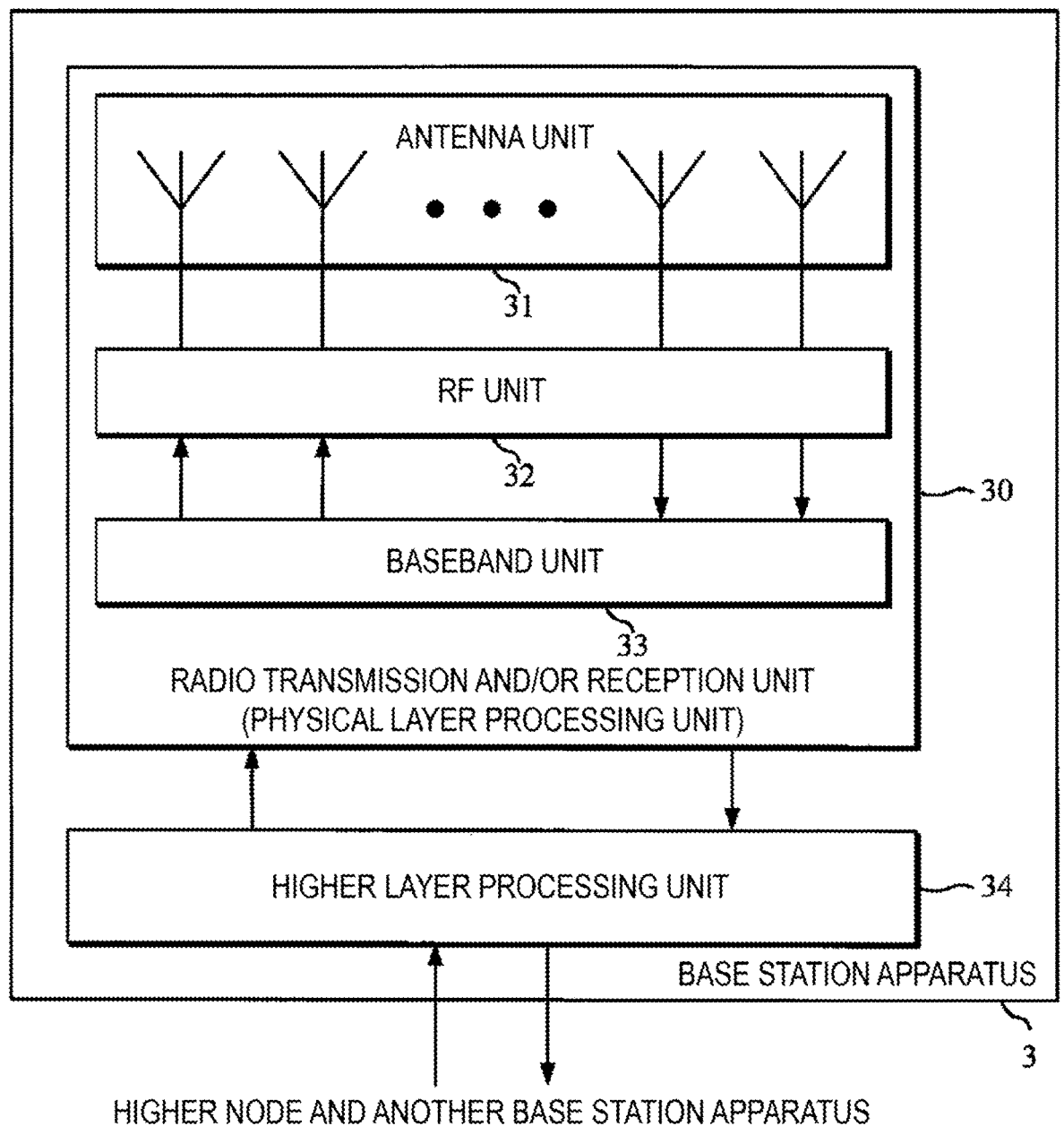
FIG. 11 is a schematic block diagram illustrating a configuration of a base station apparatus 3 according to an embodiment of the present embodiment.

FIG. 11 is a schematic block diagram illustrating a configuration of the base station apparatus 3 in the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The radio transmission and/or reception unit 30 is also referred to as a transmitter, a receiver or a physical layer processing unit. A controller controlling operations of the units based on various conditions may be separately provided. The higher layer processing unit 34 is also referred to as a terminal control unit.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer.

The higher layer processing unit 34 performs processing associated with a scheduling request, based on various types of configuration information/parameters.

The higher layer processing unit 34 generates, or acquires from a higher node, downlink data (transport block) allocated on a physical downlink shared channel, system information, an RRC message, a MAC Control Element (CE), and the like, and outputs the generated or acquired data to the radio transmission and/or reception unit 30. Furthermore, the higher layer processing unit 34 manages various types of configuration information/parameters for each of the terminal apparatuses 1. The higher layer processing unit 34 may set various types of configuration information/parameters for each of the terminal apparatuses 1 via the higher layer signal. Namely, the higher layer processing unit 34 transmits/broadcasts information indicating various types of configuration information/parameters. The higher layer processing unit 34 transmits/broadcasts information for identifying a configuration of a plurality of reference signals in a certain cell.

The radio transmission and/or reception unit 30 has a function of transmitting information for identifying configurations of a plurality of reference signals in a certain cell. The radio transmission and/or reception unit 30 has a function of transmitting a plurality of reference signals. A part of the functionality of the radio transmission and/or reception unit 30 is similar to the functionality of the radio transmission and/or reception unit 10, and hence description thereof is omitted. Note that, in a case that the base station apparatus 3 is connected to one or a plurality of transmission reception points 4, some or all of the functions of the radio transmission and/or reception unit 30 may be included in each of the transmission reception points 4.

The higher layer processing unit 34 transmits (transfers) or receives control messages or user data between the base station apparatuses 3, or between a higher-node network device (MME or Serving-GW (S-GW)) and the base station apparatus 3. Although, in FIG. 11, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a Radio Resource Management layer processing unit or an Application layer processing unit exists in the higher layer processing unit 34.

The "units" in the drawing refer to constituent elements to provide the functions and the procedures of the terminal apparatus 1 and the base station apparatus 3. Such a constituent element may be represented by different terms such as a section, a circuit, a constituting device, a device, a unit, and the like.

Each of the units having the reference signs 10 to 16 included in the terminal apparatus 1 may be configured as a circuit. Each of the units having the reference signs 30 to 36 included in the base station apparatus 3 may be configured as a circuit.

Aspects of the terminal apparatus 1 and the base station apparatus 3 according to the present embodiment will be described below.

(1) A first aspect of the present invention provides a terminal apparatus 1 including: a receiver 10 configured to identify a plurality of reference signal configurations corresponding to a plurality of reference signals transmitted from a base station apparatus 3 in a cell, and receive a plurality of reference signals based on the plurality of reference signal configurations; a measurement unit 14 configured to identify at least one first received power that is at least one received power (RSRP) of at least one reference signal corresponding to at least one first reference signal configuration that is at least part of the plurality of reference signal configurations, and identify at least one second received power that is at least one received powers (RSRP) of at least one reference signal corresponding to at least one second reference signal configuration that is at least part of the plurality of reference signal configurations; a control unit 14 configured to select a cell suitable for camping based on the at least one first received power; and a transmit power control unit 12 configured to determine transmit power of an uplink signal and/or uplink channel to be transmitted in a serving cell based on one of the at least one second received power.

(2) In the first aspect of the present invention, the plurality of reference signal configurations may include information for indicating time and/or frequency resources of the plurality of reference signals and/or antenna port numbers.

(3) In the first aspect of the present invention, the at least one first reference signal configuration and the at least one second reference signal configuration may be the same reference signal configuration.

(4) In the first aspect of the present invention, the at least one first reference signal configuration and the at least one second reference signal configuration may be different reference signal configurations.

(5) A second aspect of the present invention provides a terminal apparatus 1 including: a receiver 10 configured to receive a plurality of reference signals based on a plurality of reference signal configurations corresponding to the plurality of reference signals transmitted from a base station apparatus 3 in a cell, receive first information for indicating one reference signal used to determine transmit power of an uplink signal and/or uplink channel of the plurality of reference signals; a measurement unit 14 configured to identify a received power (RSRP) based on the one reference signal indicated by the first information; a transmit power control unit 12 configured to determine transmit power of an uplink signal and/or uplink channel based on the received power; and a transmitter 10 configured to transmit the uplink signal and/or uplink channel by using the transmit power determined.

(6) A third aspect of the present invention provides a base station apparatus 3 including a transmitter 30 configured to transmit, to a terminal apparatus 1, a plurality of reference signals based on a plurality of reference signal configurations corresponding to the plurality of reference signals transmitted in a cell, and transmits information for indicating one reference signal used to determine transmit power of an uplink signal and/or uplink channel of the plurality of reference signals; and a receiver 30 configured to receive the uplink signal and/or uplink channel.

(7) A fourth aspect of the present invention provides a base station apparatus 3 including a transmitter 30 configured to transmit, to a terminal apparatus 1, a plurality of reference signals based on a plurality of reference signal configurations corresponding to the plurality of reference signals transmitted in a cell, and transmit a parameter for the terminal apparatus 1 to select a cell suitable for camping based on at least one first received power; and a terminal control unit 34 configured to perform control for determining transmit power of an uplink signal and/or uplink channel transmitted by the terminal apparatus 1 in a serving cell based on one of at least one second received power, in which the at least one first received power is at least one received power (RSRP) of at least one of a plurality of reference signals corresponding to at least one first reference signal configuration that is at least part of the plurality of reference signal configurations, and the at least one second received power is at least one received power (RSRP) of at least one of a plurality of reference signals corresponding to at least one second reference signal configuration that is at least part of the plurality of reference signal configurations.

(A1) According to an aspect of the present invention, the following measures are provided. A fifth aspect of the present invention provides a terminal apparatus including: a receiver configured to receive a plurality of reference signals from a base station apparatus in a cell; a measurement unit configured to measure at least one reference signal received power (RSRP) of at least one of the plurality of reference signals; and a calculating unit configured to average N highest ones of the at least one RSRP measured to obtain a reference RSRP of the cell.

(A2) A sixth aspect of the present invention provides the terminal apparatus further including a transmit power control unit configured to determine, based on one of the at least one RSRP, transmit power of an uplink signal and/or an uplink channel to be transmitted in the cell.

(A3) A seventh aspect of the present invention provides the terminal apparatus in which the plurality of reference signals are secondary synchronization signals.

(A4) An eighth aspect of the present invention provides a base station apparatus including: a transmitter configured to transmit, to a terminal apparatus, a plurality of reference signals in a cell; and a receiver configured to receive a measurement report on a reference reference signal received power (RSRP) obtained by averaging N RSRP of at least one RSRP of at least one of the plurality of reference signals received by the terminal apparatus.

(A5) A ninth aspect of the present invention provides the base station apparatus in which the receiver receives, from the terminal apparatus, an uplink signal and/or uplink channel transmitted at transmit power based on one of the at least one RSRP.

(A6) A tenth aspect of the present invention provides the base station apparatus in which the plurality of reference signals are secondary synchronization signals.

(A7) An eleventh aspect of the present invention provides a communication method used for a terminal apparatus including: receiving a plurality of reference signals from a base station apparatus in a cell; measuring at least one reference signal received power (RSRP) of at least one of the plurality of reference signals; and averaging N highest ones of the at least one RSRP measured to obtain a reference RSRP of the cell.

(A8) A twelfth aspect of the present invention provides a communication method used for a base station apparatus including: transmitting, to a terminal apparatus, a plurality of reference signals in a cell; and receiving a measurement report on a reference reference signal received power (RSRP) obtained by averaging N RSRP of at least one RSRP of at least one of the plurality of reference signals received by the terminal apparatus.

A program running on an apparatus according to an aspect of the present invention may serve as a program that controls a Central Processing Unit (CPU) and the like to cause a computer to operate in such a manner as to realize the functions of the embodiment according to an aspect of the present invention. Programs or the information handled by the programs are temporarily stored in a volatile memory, such as a Random Access Memory (RAM), in a non-volatile memory, such as a flash memory, in a Hard Disk Drive (HDD), or in other storage apparatus systems.

Note that a program for implementing the functions of an embodiment according to an aspect of the present invention may be recorded in a computer-readable recording medium. The functions may be implemented with a computer system reading and executing the program recorded in the recording medium. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically holding a program in a short period of time, and other computer-readable recording media.

Furthermore, each functional block or various characteristics of the apparatuses used in the above-described embodiments may be implemented or performed on an electric circuit, that is an integrated circuit or multiple integrated circuits, for example. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of known type, a controller, a micro-controller, or a state machine instead. The above-mentioned electric circuits may be constituted of a digital circuit, or may be constituted of an analog circuit. Furthermore, in a case that with advances in semiconductor technology, a circuit integration technology that replaces the present integrated circuits is introduced, one or a plurality of aspects of the present invention may use new integrated circuits based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B) Terminal apparatus
3 Base station apparatus
4 Transmission reception point (TRP)
10 Radio transmission and/or reception unit
11 Antenna unit
12 RF unit
13 Baseband unit
14 Higher layer processing unit
30 Radio transmission and/or reception unit
31 Antenna unit
32 RF unit
33 Baseband unit
34 Higher layer processing unit
50 Transmission unit (TXRU)

51 Phase shifter
52 Antenna element

The invention claimed is:

1. A terminal apparatus comprising:
reference signal reception circuitry configured to receive multiple second reference signals among multiple reference signals transmitted from a base station apparatus on a first cell;
measurement circuitry configured to measure multiple Reference Signal Received Powers (RSRPs), each of the multiple RSRPs corresponding to each of the multiple second reference signals on the first cell;
calculation circuitry configured to calculate a reference value of the RSRP of the first cell by averaging N highest RSRPs of the multiple RSRPs;
transmission circuitry configured to send the reference value of the RSRP of the first cell to the base station apparatus;
transmission power control circuitry configured to identify one or more first reference signals among the multiple reference signals, the one or more first reference signals being identified by information, to calculate a downlink path loss based on an RSRP corresponding to one of the one or more first reference signals identified, and to determine a transmission power of a Physical Uplink Shared Channel (PUSCH) of the first cell by using the downlink path loss calculated, and
Radio Resource Control (RRC) layer reception circuitry configured to receive, from the base station apparatus, the information through an RRC signaling, wherein
the information supports at least a configuration such that some of the multiple second reference signals are identified as the one or more first reference signals.

2. The terminal apparatus according to claim 1, wherein, the reference signal reception circuitry is configured to receive the multiple second reference signals, to which transmission beams independent from each other have been applied, from the base station apparatus on the first cell.

3. The terminal apparatus according to claim 1, wherein the multiple reference signals are synchronization signals.

4. A base station apparatus comprising:
transmission circuitry configured to transmit, to a terminal apparatus, multiple reference signals on a first cell;
reception circuitry configured to receive, from the terminal apparatus, a reference value of a Reference Signal Received Power (RSRP) of the first cell, wherein
the multiple reference signals include multiple second reference signals to be used by the terminal apparatus to calculate the reference value of the RSRP indicating an averaged value of one or more RSRPs of the multiple RSRPs, each of the multiple RSRPs corresponding to each of the multiple second reference signals, and the multiple reference signals include one of one or more first reference signals, the RSRP corresponding to one of the one or more first reference signals being used by the terminal apparatus to determine a transmission power of a Physical Uplink Shared Channel (PUSCH) of the first cell;
control circuitry configured to determine the one or more first reference signals from the multiple reference signals; and
Radio Resource Control (RRC) layer transmission circuitry configured to transmit, to a terminal apparatus, information for identifying the one or more first reference signals through an RRC signaling to cause the terminal apparatus to identify the one or more first reference signals, to calculate a downlink path loss based on an RSRP corresponding to one of the one or more first reference signals identified, and to determine the transmission power of the PUSCH of the first cell by using the downlink path loss calculated, wherein
the information supports at least a configuration such that some of the multiple second reference signals are identified as the one or more first reference signals.

5. The base station apparatus according to claim 4, wherein
the reference signal transmission circuitry is configured to transmit the multiple reference signals, to which transmission beams independent from each other have been applied, to the terminal apparatus on the first cell.

6. The base station apparatus according to claim 4, wherein
the multiple reference signals are synchronization signals.

7. A communication method used for a terminal apparatus, the communication method comprising:
receiving multiple second reference signals among multiple reference signals transmitted from a base station apparatus on a first cell;
measuring multiple Reference Signal Received Powers (RSRPs), each of the multiple RSRPs corresponding to each of the multiple second reference signals;
calculating a reference value of the RSRP of the first cell by averaging N highest RSRPs of the multiple RSRPs;
sending the reference value of the RSRP of the first cell to the base station apparatus;
identifying one or more first reference signals among the multiple reference signals, the one or more first reference signals being identified by information;
calculating a downlink path loss based on an RSRP corresponding to one of the one or more first reference signals identified;
determining a transmission power of a Physical Uplink Shared Channel (PUSCH) of the first cell by using the downlink path loss calculated; and
receiving, from the base station apparatus, the information through an RRC signaling, wherein
the information supports at least a configuration such that some of the multiple second reference signals are identified as the one or more first reference signals.

8. A communication method used for a base station apparatus, the communication method comprising:
transmitting, to a terminal apparatus, multiple reference signals on a first cell;
receiving, from the terminal apparatus, a reference value of a Reference Signal Received Power (RSRP) of the first cell, wherein
the multiple reference signals include multiple second reference signals to be used by the terminal apparatus to calculate the reference value of the RSRP indicating an averaged value of one or more RSRPs of the multiple RSRPs, each of the multiple RSRPs corresponding to each of the multiple second reference signals, and the multiple reference signals include one of one or more first reference signals being used by the terminal apparatus to calculate a downlink path loss based on an RSRP corresponding to one of the one or more first reference signals identified, and to determine a transmission power of a Physical Uplink Shared Channel (PUSCH) of the first cell by using the downlink path loss calculated;
determining the one or more first reference signals from the multiple reference signals; and transmitting, to the terminal apparatus, information for identifying the one or more first reference signals through an RRC signaling to cause the terminal apparatus to identify the one or more first reference signals to determine the transmission power of the PUSCH, wherein the information supports at least a configuration such that some of the multiple second reference signals are identified as the one or more first reference signals.

* * * * *